W. D. TABER.

Improvement in Egg-Carriers.

No. 5,300. Reissued Feb. 25, 1873.

Witnesses.

A Kirchell

H C A Clark

Inventor.

W. D. Taber.

AM. PHOTO-LITHOGRAPHIC CO. N.Y. (OSBORNE'S PROCESS)

UNITED STATES PATENT OFFICE.

WILLIAM D. TABER, OF BUFFALO, NEW YORK, ASSIGNOR OF ONE-HALF INTEREST TO PHILIP P. JOSEF AND EDWARD STRIBER.

IMPROVEMENT IN EGG-CARRIERS.

Specification forming part of Letters Patent No. 132,937, dated November 12, 1872; antedated November 9, 1872; reissue No. 5,300, dated February 25, 1873.

*To all whom it may concern:*

Be it known that I, WILLIAM D. TABER, of the city of Buffalo, in the county of Erie and State of New York, have invented certain Improvements in Egg-Carriers, of which the following is a specification:

The first part of my invention relates to the form and method of construction of the sides or walls of the pockets or compartments for holding the separate eggs, and has for its object greater safety, economy of space, lightness, strength, durability, and cheapness, than has hitherto been attained. The second part of my invention relates to the method of forming the bottoms and tops of said pockets, and the combination of the same with the sides or walls of such pockets. These improvements are applicable to carriers in which the eggs stand, in a vertical position, upon their ends in their pockets. The accompanying drawing represents them as applied to the class of carriers patented by Philip P. Josef, April 6, 1869, in which there are trays having pockets on both their faces, each pocket of sufficient depth to inclose a little less than half the egg, the other half being inclosed by the next tray above it.

Figure 1:
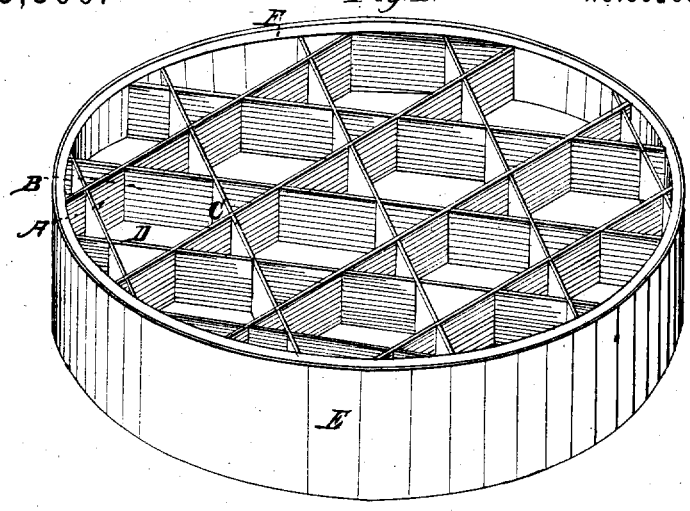
Figure 2:
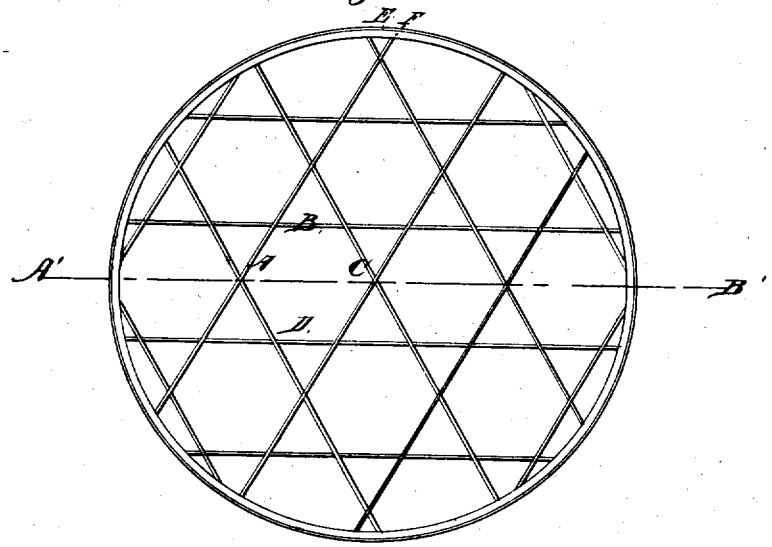
Figure 3:
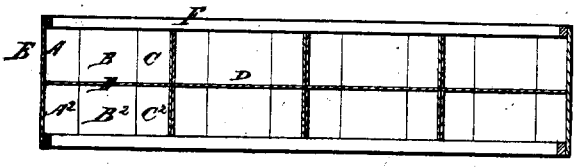

Figure 1 is a perspective view of a tray, showing the upper series of pockets in the same; the under series is directly opposite to them, and of similar construction. Fig. 2 is a plan of said tray. Fig. 3 is an elevation through the section of A′ B′ of Fig. 2.

The side walls of the pockets are made of a depth to vary but little from one-half of the average length of the eggs to be placed therein, and are formed by the slats or thin strips of wood, strawboard, or other sufficiently flexible, soft, or elastic material A B C, crossing each other at an angle of sixty degrees, so as to form pockets with six equal sides. These cross-strips are, by preference, fastened together or notched in at their intersections by the common method of halving down—B and C being each cut down one-half their width from opposite edges, A about three-fourths, and B and C one-fourth, at their intersections with A. D is a diaphragm of any suitable material; but, by preference, a thin sheet of wood, composed of one or more layers between the upper and under series of pockets, constituting the bottom of the upper and the top of the under series. E is the hoop of the tray. $A^2$ $B^2$ $C^2$, in Fig. 3, represent the strips forming the side walls of the lower series, and are similar to A B C in the upper series. F F are narrow rings fastened to the inside edges of the tray-hoop E, to secure the ends of the strips in their places in the tray; or these rings may be dispensed with, and the walls of the pockets extended to the full depth of the rim, which should be about two and a half inches; in which case the two series of half pockets may be unequally divided, so as to make the under series of greater depth than the upper. For the top and bottom of the box or crate in which these trays are to be placed, half trays are to be used—that is, trays with only the upper series of pockets for the bottom, and those with only the lower series for the top of the box or crate.

I limit my claim on the use of upper and under half-pockets to trays in which they are separated by the diaphragm D, this being an improvement on Philip P. Josef's patent, April 6, 1869. I do not limit my claim on the diaphragm D as only applicable to the form of pocket herein described; for it is evident that it would answer the purpose for which it is intended—viz., to support the eggs which stand upon it, and to keep the eggs below it from contact with those above it—whether such pockets are hexagonal, rectangular, or of any other shape. I do not claim the connecting the strips by halving, as that is an old and well-known device.

What I do claim as new, and desire to secure by Letters Patent, is—

1. Pockets for egg-carriers of a hexagonal form, when made by means of cross-strips, as described.

2. The diaphragm D, when combined with the series of half-pockets forming a tray with upper and under pockets, substantially as described.

3. A tray, composed of a series of upper and under half-pockets separated by the diaphragm D or its equivalent.

WILLIAM D. TABER.

Witnesses:

JOHN HOLEHOUSE,
CHAS. BURCHARD.